United States Patent
Kim et al.

(10) Patent No.: US 8,940,438 B2
(45) Date of Patent: Jan. 27, 2015

(54) NEGATIVE ELECTRODE INCLUDING GROUP 14 METAL/METALLOID NANOTUBES, LITHIUM BATTERY INCLUDING THE NEGATIVE ELECTRODE, AND METHOD OF MANUFACTURING THE NEGATIVE ELECTRODE

(75) Inventors: Han-su Kim, Seoul (KR); Un-gyu Paik, Seoul (KR); Jae-man Choi, Hwaseong-si (KR); Moon-seok Kwon, Hwaseong-si (KR); Tae-seob Song, Seoul (KR); Won-il Park, Seoul (KR)

(73) Assignees: Samsung Electronics Co., Ltd. (KR); Industry-University Cooperation Foundation Hanyang University (KR)

( * ) Notice: Subject to any disclaimer, the term of this patent is extended or adjusted under 35 U.S.C. 154(b) by 1334 days.

(21) Appl. No.: 12/704,746

(22) Filed: Feb. 12, 2010

(65) Prior Publication Data

US 2010/0209775 A1    Aug. 19, 2010

(30) Foreign Application Priority Data

Feb. 16, 2009  (KR) .................. 10-2009-0012601
Nov. 5, 2009   (KR) .................. 10-2009-0106667

(51) Int. Cl.
| | | |
|---|---|---|
| H01M 4/13 | (2010.01) | |
| H01M 4/134 | (2010.01) | |
| H01M 4/1395 | (2010.01) | |
| B05D 5/12 | (2006.01) | |
| H01M 4/04 | (2006.01) | |
| H01M 4/66 | (2006.01) | |
| B82Y 30/00 | (2011.01) | |
| H01M 10/052 | (2010.01) | |
| H01M 4/02 | (2006.01) | |

(52) U.S. Cl.
CPC ............... *H01M 4/661* (2013.01); *H01M 4/04* (2013.01); *H01M 2004/027* (2013.01); *H01M 4/134* (2013.01); *B82Y 30/00* (2013.01); *H01M 4/1395* (2013.01); *H01M 4/669* (2013.01); *Y02E 60/122* (2013.01); *H01M 4/0421* (2013.01); *H01M 10/052* (2013.01)
USPC .......................... 429/218.1; 427/115; 429/209

(58) Field of Classification Search
None
See application file for complete search history.

(56) References Cited

U.S. PATENT DOCUMENTS

| | | | |
|---|---|---|---|
| 6,887,623 B2 | 5/2005 | Fujimoto et al. | |
| 7,205,069 B2 * | 4/2007 | Smalley et al. | ............... 429/129 |
| 2006/0040182 A1 * | 2/2006 | Kawakami et al. | ......... 429/218.1 |
| 2008/0044732 A1 * | 2/2008 | Salot et al. | ..................... 429/322 |
| 2008/0280207 A1 | 11/2008 | Patoux et al. | |

FOREIGN PATENT DOCUMENTS

| | | |
|---|---|---|
| FR | 2880198 | 12/2004 |
| FR | 2895572 | 12/2005 |
| JP | 2001210315 A | 8/2001 |

(Continued)

OTHER PUBLICATIONS

EP Office Action—EP Application No. EP10153744 dated Dec. 23, 2011.

(Continued)

*Primary Examiner* — Sarah A Slifka
(74) *Attorney, Agent, or Firm* — Cantor Colburn LLP

(57) ABSTRACT

A negative electrode and a lithium battery including the same, the negative electrode including nanotubes including a Group 14 metal/metalloid, disposed on a conductive substrate.

25 Claims, 9 Drawing Sheets

(56) References Cited

FOREIGN PATENT DOCUMENTS

| | | |
|---|---|---|
| JP | 2004288564 A | 10/2004 |
| JP | 2004533699 A | 11/2004 |
| JP | 2005139044 A | 2/2005 |
| JP | 2006512218 A | 4/2006 |
| JP | 2007223896 A | 9/2007 |
| JP | 2007534118 A | 11/2007 |
| JP | 2008016446 A | 1/2008 |
| JP | 2008140638 A | 6/2008 |
| JP | 2008159589 A | 7/2008 |
| JP | 2008525954 A | 7/2008 |
| KR | 10-2005-0075374 | 7/2005 |
| KR | 10-2005-0085437 | 8/2005 |
| WO | 2007061945 | 5/2007 |
| WO | 2008054854 A2 | 5/2008 |
| WO | 2009009206 A2 | 1/2009 |
| WO | 2009010758 A2 | 1/2009 |
| WO | WO2009043585 * | 4/2009 |
| WO | 2010117392 | 10/2010 |
| WO | 2011075489 | 6/2011 |

OTHER PUBLICATIONS

Candace K. Chan et al., "High-performance lithium battery anodes using silicon nanowires", Letters, vol. 3, Jan. 2008, p. 31-35.

Nguyen Duc Hoa et al., "Tin oxide nanotube structures synthesized on a template of single-walled carbon nanotubes", Journal of Crystal Growth, Vo. 311, 2009, p. 657-661.

Cheng Mu et al., "Silicon Nanotube Array/Gold Electrode for Direct Electrochemistry of Cytochrome c", J. Phys. Chem. B, vol. 111, 2007, p. 1491-1495.

Japanese Non-Final Office Action for Japanese Patent Application No. 2010-031247; Dated: Jan. 3, 2014, with English Translation.

* cited by examiner

NEGATIVE ELECTRODE INCLUDING GROUP 14 METAL/METALLOID NANOTUBES, LITHIUM BATTERY INCLUDING THE NEGATIVE ELECTRODE, AND METHOD OF MANUFACTURING THE NEGATIVE ELECTRODE

CROSS-REFERENCE TO RELATED APPLICATIONS

This application claims the benefit of Korean Patent Application No. 10-2009-0012601, filed Feb. 16, 2009, and Korean Patent Application No. 10-2009-0106667, filed Nov. 5, 2009, in the Korean Intellectual Property Office, the disclosures of which are incorporated herein, by reference.

BACKGROUND

1. Field

The present disclosure relates to a negative electrode including Group 14 metal/metalloid nanotubes, a lithium battery including the negative electrode, and a method of manufacturing the negative electrode.

2. Description of the Related Art

Carbonaceous materials such as graphite are representative examples of negative electrode active materials for lithium batteries. Graphite has excellent electrical capacity retention characteristics and excellent voltage characteristics. In addition, since graphite does not vary in volume when lithium is intercalated or deintercalated, graphite can increase the stability of batteries. Graphite has a theoretical electrical capacity of about 372 mAh/g and a high irreversible capacity.

In addition, metals capable of forming alloys with lithium may be used as a negative electrode active material for lithium batteries. Examples of metals capable of forming alloys with lithium include silicon (Si), tin (Sn), aluminum (Al), and the like. These metals have a very high electrical capacity. For examples, these metals may have an electrical capacity that is 10 times higher than that of graphite. Such metals undergo volume expansion or shrinkage during charging/discharging, thereby electrically isolating the active material within the electrode. In addition, the decomposition reaction of electrolytes becomes severe, due to an increase in the specific surface area of the active material.

In order to suppress the volume expansion and decomposition reaction of electrolytes, metals capable of forming alloys with lithium may be formed with nano-sized structures. For example, Si-nanowires may be used. However, Si-nanowires have a high volume expansion rate and may be cracked during charging/discharging.

Therefore, there is a demand for a negative electrode for lithium batteries that includes a high-capacity negative electrode active material having the ability to absorb stress due to volume expansion and thereby, have a high durability.

SUMMARY

According to various embodiments, provided is a negative electrode including Group 14 metal/metalloid nanotubes.

According to various embodiments, provided is a lithium battery including the negative electrode.

According to various embodiments, provided is a method of manufacturing the negative electrode.

According to an aspect of the present disclosure, a negative electrode includes a conductive substrate, and a plurality of Group 14 metal/metalloid nanotubes arranged at an interval on the conductive substrate.

According to another aspect of the present disclosure, a lithium battery includes: a positive electrode: the negative electrode defined above; and an electrolyte disposed between the positive electrode and the negative electrode.

According to another aspect of the present disclosure, a method of manufacturing a negative electrode includes: growing nanorods on a conductive substrate; forming a Group 14 metal/metalloid coating layer on the nanorods; and thermally treating the resultant, to selectively remove the nanorods from the coating layer.

Additional aspects and/or advantages of the present disclosure will be set forth in part in the description which follows and, in part, will be obvious from the description, or may be learned by practice of the disclosure.

BRIEF DESCRIPTION OF THE DRAWINGS

These and/or other aspects and advantages of the present disclosure will become apparent and more readily appreciated from the following description of the exemplary embodiments, taken in conjunction with the accompanying drawings, of which.

DETAILED DESCRIPTION

Figure 1:
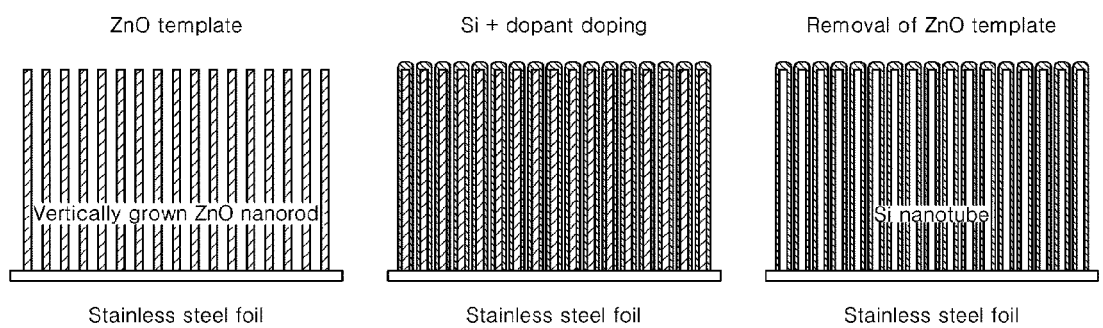
FIG. 1 schematically illustrates a method of manufacturing a negative electrode according to Example 1.

Reference will now be made in detail to the exemplary embodiments of the present disclosure, examples of which are illustrated in the accompanying drawings, wherein like reference numerals refer to the like elements throughout. The exemplary embodiments are described below, in order to explain the aspects of the present disclosure, by referring to the figures.

Hereinafter, a negative electrode, a lithium battery including the negative electrode, and a method of manufacturing the negative electrode, according to exemplary embodiments of the present disclosure, will be described in detail.

According to an aspect of the present disclosure, provided is a negative electrode that includes: a conductive substrate; and a plurality of Group 14 metal/metalloid nanotubes arranged at intervals on the conductive substrate. In other words, the negative electrode has a structure in which the nanotubes are bound to the conductive substrate and form a negative electrode active material. The nanotubes and the conductive substrate are integrated as a single body. Herein, the Group 14 metals/metalloid nanotubes may be referred to simply as "the nanotubes".

The Group 14 metal/metalloids nanotubes are tube-shaped nanostructures, similar to carbon nanotubes, consisting of Group 14 metal and/or metalloid atoms. The volumetric expansion of the nanotubes walls during charging and discharging is absorbed, due to the internal voids of the nanotubes. The internal voids of the nanotubes may allow the nanotubes to more effectively suppress volumetric expansion, as compared to Group 14 metal nanowires. For example, the nanotubes may have a volume expansion ratio of about 100% or less, about 70% or less, or about 42% or less, in a lengthwise direction, when being charged and discharged. Thus, the nanotubes can more affectively absorb stresses due to the volumetric expansion thereof, during charging and discharging. Thus, a battery including the present negative electrode may have a higher capacity retention rate. In addition, the nanotubes have a shorter electron diffusion distance than nanowires having the same diameter, which may lead to improved reaction reversibility. As a result, the coulombic efficiency of the battery may be improved. In addition, the battery has an improved discharge capacity, due to the use of the Group 14 metal/metalloid nanotubes as a negative electrode active material.

The Group 14 metal/metalloid nanotubes may be spaced on the negative electrode, at an interval of 100 nm or less. For example, the nanotubes may be spaced at an interval of about 70 nm to about 90 nm.

According to another exemplary embodiment, the Group 14 metal/metalloid may be at least one element selected from the group consisting of silicon (Si), germanium (Ge), tin (Sn), and an alloy thereof. For example, the nanotubes may be Si nanotubes, Ge nanotubes, or Sn nanotubes. The above alloy may include at least two elements selected from the group consisting of Si, Ge, and Sn.

According to another exemplary embodiment, the nanotubes may further include a dopant. The dopant contributes to the injection electrons or holes into the lattice of the nanotubes. Thus, the dopant improves the conductivity of the nanotubes.

The dopant may be a Group 13 or Group 15 element. Examples of the dopant include boron (B), aluminum (Al), gallium (Ga), indium (In), thallium (Tl), phosphorous (P), arsenic (As), antimony (Sb), and bismuth (Bi). The Group 13 element may be a p-type dopant, and the Group 15 element may be an n-type dopant. The addition of the dopant may improve the reversibility of the electrode.

According to another exemplary embodiment, the nanotubes may be arranged to protrude from the surface of the conductive substrate. For example, the silicon nanotubes may extend approximately in perpendicular to the corresponding surface of the conductive substrate to which they are attached. For example, the nanotubes may be arranged at an angle of about 45° to about 135° with respect to the corresponding surface of the conductive substrate. In this regard, the nanotubes may be arranged at an angle of about 80° to about 100° with respect to the surface of the conductive substrate. The negative electrode including the vertically arranged nanotubes may improve the discharge capacity, capacity retention rate, and coulombic efficiency of a lithium battery. For example, a larger amount of the nanotubes may be arranged within the same area of the conductive substrate. Thus, the electrical capacity per unit area of the negative electrode may be increased.

According to another exemplary embodiment, at least one of the Group 14 metal/metalloid nanotubes of the negative electrode may have a length greater than 5 μm. For example, at least one of the nanotubes may have a length of about 5 μm to about 200 μm, about 5 μm to about 100 μm, about 5 μm to about 50 μm, or about 5 μm to about 30 μm. In some aspects, the above lengths relate to an average length of the nanotubes. If the average length of the nanotubes of the negative electrode is within the range above, a lithium battery including the negative electrode may have a higher discharge capacity, a higher capacity retention rate, and a higher coulombic efficiency.

According to another exemplary embodiment, at least one of the nanotubes of the negative electrode may have a lengthwise volume expansion ratio of 100% or less. For example, when lithium metal is charged and discharged with a voltage of 0.01V to 2V, by supplying a current of 150 mA per 1 g of the nanotubes, at least one of the nanotubes may have a lengthwise volume expansion ratio of 100% or less. For example, at least one of the nanotubes may have a lengthwise volume expansion ratio of about 0% to about 100%, about 70% or less, or about 42% or less. The recited volume expansion ratios can refer to an average volume expansion ratio of the nanotubes. The term "lengthwise volume expansion ratio" used throughout the specification is defined as Equation 1 below:

$$\text{Lengthwise volume expansion ratio}[\%] = \{(\text{Length of lithium-intercalated Group 14 metal/metalloid nanotubes} - \text{Length of fresh Group 14 metal/metalloid nanotubes})/(\text{Length of fresh Group 14 metal/metalloid nanotubes})\} \times 100 \quad \text{Equation 1}$$

With regard to Equation 1 above, the length of fresh Group 14 metal/metalloid nanotubes refers to the length the nanotubes of the negative electrode, before the negative electrode is assembled into a battery. The length of lithium-intercalated Group 14 metal/metalloid nanotubes refers to a maximum length of lithium-intercalated nanotubes, during 40 cycles, or less, of charging and discharging.

According to another exemplary embodiment, a volume occupied by the nanotubes (i.e., substrate occupation ratio) may be greater than 50%, with respect to a total volume defined by a maximum length of the nanotubes and the area of the substrate. For example, the volume occupied by the nanotubes may be greater than 70%. In particular, the volume occupied by the nanotubes may be in the range of about 58% to about 99%. In addition, a volume of the empty space between the nanotubes, with respect to the total volume defined by a maximum length of the nanotubes and the area of the substrate, may be less than 50%. For example, the volume of the empty space may be less than 20%. The volume occupied by the nanotubes refers to a volume defined by the outer diameters and lengths of the metal nanotubes. The volume occupied by the nanotubes can be any volume within the above ranges.

Inner voids (inner volumes) of the individual nanotubes can absorb lengthwise volume expansions thereof. For example, the space between the nanotubes may be reduced when the inner volumes thereof are increased.

According to another exemplary embodiment, the nanotubes of the negative electrode may occupy about 50% to about 99% of the total area of the conductive substrate. The area of the conductive substrate occupied by the nanotubes is calculated based on the outer diameters of the nanotubes. For example, the nanotubes may occupy 51% or more of the total area of the conductive substrate. In this regard, the area occupied by the nanotubes may be 70% or more of the total area of the conductive substrate, may be 80% or more of the total area of the conductive substrate, or may be 90% or more of the total area of the conductive substrate. The larger the area of the conductive substrate occupied by the nanotubes, the larger the capacity density of the negative electrode.

According to another exemplary embodiment, at least one of the nanotubes may have an outer diameter greater than 50 nm. For example, at least one of the nanotubes may have an outer diameter of about 50 nm to about 500 nm, about 50 nm to about 300 nm, about 50 nm to about 300 nm, or about 110 nm to about 240 nm. If the average outer diameter of the nanotubes is within the range above, a lithium battery including the negative electrode may have a higher discharge capacity, a higher capacity retention rate, and a higher coulombic efficiency.

According to another exemplary embodiment, at least one of the nanotubes may have an inner diameter of about 20 nm to about 200 nm. In other words, the inner voids of the nanotubes may have a diameter of about 20 nm to about 200 nm. For example, at least one of the nanotubes may have an inner diameter of about 50 µm to about 30 µm, or an inner diameter of about 70 nm to about 120 nm. If the average inner diameter of the nanotubes is within the range above, a lithium battery including the negative electrode may have a higher discharge capacity, a higher capacity retention rate, and a higher coulombic efficiency.

According to another exemplary embodiment, at least one of the nanotubes may have a wall thickness of about 20 nm to about 100 nm. For example, at least one of the nanotubes may have a wall thickness of about 20 nm to about 70 nm. If the wall thickness of at least one of the nanotubes of the negative electrode is within the range above, a lithium battery including the negative electrode may have a higher discharge capacity, a higher capacity retention rate, and a higher coulombic efficiency. For example, if the average wall thickness of the nanotubes is within the range above, the capacity per unit area of the electrode may be increased, side reactions due to an increase in specific surface area may be less likely to occur, and mechanical deterioration of the nanotubes caused by charging and discharging may also be less likely to occur.

According to another exemplary embodiment, the nanotubes of the negative electrode may have void volumes (empty inner spaces) defined by their inner diameter and length.

According to another exemplary embodiment, the nanotubes of the negative electrode may have a closed end. In other words, the nanotubes may be shaped like test tubes, with an open end of the tubes being attached to the substrate, and the closed end being spaced apart from the substrate. The closed ends of the nanotubes may have various shapes, for example, may be planar or hemispherical.

According to another exemplary embodiment, the conductive substrate of the negative electrode may include one selected from the group consisting of stainless steel, copper (Cu), nickel (Ni), iron (Fe), and cobalt (Co). The conductive substrate may be any metallic substrate with excellent conductivity that is commonly used in the field.

The conductive substrate may be any non-metallic substrate with suitable conductivity. For example, the conductive substrate may be a conductive oxide substrate or a conductive polymer substrate. In addition, the conductive substrate may have various structures, for example, a structure entirely formed of a conductive material, a structure including a conductive metal, a conductive metal oxide, or a conductive polymer coated on a surface of an insulating substrate, or the like.

The conductive substrate may be a flexible substrate. Thus, the conductive substrate may be resiliently deformable.

The conductive substrate may have a thickness of 10 mm or less. For example, the conductive substrate may have a thickness of about 0.1 µm to about 10 mm, about 0.1 µm to about 1000 µm, or about 1 µm to about 100 µm.

According to another exemplary embodiment, a conductive substrate on which the nanotubes are vertically arranged may form the negative electrode. Alternatively, the negative electrode may further include a negative electrode active material. For example, the negative electrode may include a negative electrode active composition containing a general negative electrode active material and a binder, in addition to the conductive substrate on which the nanotubes are arranged. For example, the negative electrode may be manufactured by molding a negative electrode active material composition, including a general negative electrode active material, a binder, and a solvent, into a desired shape and then laminating the molded material on the conductive substrate having the nanotubes. In the alternative, the negative electrode active material composition may be coated on the current collector.

For example, the negative electrode active material composition may be directly coated on the conductive substrate, on which the nanotubes are arranged, to obtain a negative electrode plate. Alternatively, the negative electrode active material composition may be cast on a separate support, to form a negative electrode active material film. Then the negative electrode active material film is separated from the support and laminated on a conductive substrate, on which the nanotubes are arranged, to obtain a negative electrode plate. The negative electrode is not limited to the examples described above, and may be any of a variety of types. For example, the negative electrode may be manufactured by printing a negative electrode active material ink, containing a general negative electrode active material and an electrolytic solution, on the conductive substrate, according to an inkjet printing method.

Examples of the general negative electrode active material include silicone metal, a silicon thin film, lithium metal, a lithium alloy, a carbonaceous material, and/or graphite, but are not limited thereto. Any suitable negative electrode active material available in the field may be used.

Examples of the negative electrode active material may include: tungsten oxide, molybdenum oxide, titanium oxide, lithium titanium oxide, vanadium oxide, lithium vanadium oxide; silicon (Si), $SiO_x$ (0<x<2), a Si—Y alloy (wherein Y is an alkali metal, alkali earth metal, a Group 13 element, a Group 14 element, a transition metal, a rare-earth element, or a combination thereof, excluding Si), tin (Sn), $SnO_2$, Sn—Z, or a mixture of at least one thereof and $SiO_2$ (wherein Z is selected from the group consisting of magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), and a combination thereof); natural graphite or artificial graphite that are in amorphous, plate, flake, spherical or fibrous form; soft carbon (carbon sintered at low temperatures), hard carbon; meso-phase pitch carbides; sintered corks, and the like.

The negative electrode active material may be in powder form. The negative electrode active material in powder form may be used in a negative electrode active material composition or a negative electrode active material ink.

For a battery capable of charging and discharging a large amount of current, a material having low electrical resistance may be used. Any suitable kind of a conductive agent may be added to reduce resistance of the negative electrode. In this regard, examples of the conductive agent that are commonly used may include carbon black, and graphite particulates.

According to another aspect of the present disclosure, a lithium battery includes: a positive electrode; a negative electrode including the nanotubes; and an electrolyte disposed between the positive electrode and the negative electrode. The lithium battery may be manufactured in the following manner.

Initially, the negative electrode described above is prepared. Next, a positive electrode active material, a conductive agent, a binder, and a solvent are mixed to prepare a positive electrode active material composition. The positive electrode active material composition is directly coated on a metallic current collector and dried, to prepare a positive electrode plate. Alternatively, the positive electrode active material composition may be cast on a separate support to form a positive electrode active material film. The positive electrode active material film, after being separated from the support, may be laminated on a metallic current collector, to prepare a positive electrode plate.

The positive electrode active material is a compound capable of intercalating/deintercalating lithium. Any suitable material available as a negative electrode active material in the field may be used. Examples of the positive electrode active material include $LiCoO_2$, $LiMn_xO_{2x}$ where x=1 or 2, $LiNi_{1-x}Mn_xO_2$ where 0<x<1, $LiNi_{1-x-y}Co_xMn_yO_2$ where $0 \leq x \leq 0.5$ and $0 \leq y \leq 0.5$, $LiFeO_2$, $V_2O_5$, TiS, and MoS.

The conductive agent may be carbon black or graphite particulates, but is not limited thereto. Any suitable material available as a conductive agent in the field may be used.

Examples of the binder include a vinylidene fluoride/hexafluoropropylene copolymer, polyvinylidene fluoride (PVDF), polyacrylonitrile, polymethylmethacrylate, polytetrafluoroethylene, mixtures of these materials, and a styrene butadiene rubber polymer, but are not limited thereto. Any suitable material available as a binding agent in the field may be used.

Examples of the solvent include N-methyl-pyrrolidone, acetone, and water, but are not limited thereto. Any material available as a solvent in the field may be used.

The amounts of the positive electrode active material, the conductive agent, and the solvent are amounts commonly used in a lithium battery. At least one of the conductive agent, the binder, and the solvent may be excluded, according to the use and the structure of the lithium battery.

Next, a separator is inserted between the positive electrode and the negative electrode. The separator may be any suitable separator that is commonly used for lithium batteries. The separator may have low resistance to the migration of ions in an electrolyte and may have an excellent electrolyte-retaining ability. Examples of the separator may include glass fiber, polyester, Teflon, polyethylene, polypropylene, polytetrafluoroethylene (PTFE), and a combination thereof, each of which may be a non-woven fabric or a woven fabric. For example, a windable separator including polyethylene or polypropylene may be used for a lithium ion battery. For example, a separator with the ability to retain a large amount of an organic electrolytic solution may be used for a lithium-ion polymer battery. The separator with the ability to retain a large amount of an organic electrolytic solution may be manufactured using the following method.

A polymer resin, a filler, and a solvent are mixed to prepare a separator composition. Then, the separator composition may be directly coated on an electrode, and then dried to form the separator. Alternatively, the separator composition may be cast on a support and then dried to form a separator film. After being separated from the support, the separator film may be laminated on an electrode to form the separator.

The polymer resin may be any material that is commonly used as a binder for an electrode plate. Examples of the polymer resin include a vinylidenefluoride/hexafluoropropylene copolymer, polyvinylidene fluoride (PVDF), polyacrylonitrile, polymethylmethacrylate, and a mixture thereof.

Next, an electrolyte is prepared. According to an exemplary embodiment, the electrolyte may be in a liquid or gel phase. For example, the electrolyte may be an organic electrolytic solution. Alternately, the electrolyte may be in a solid phase. For example, the electrolyte may be lithium oxide or lithium oxynitride, but is not limited thereto. Any material available as a solid electrolyte in the field may be used. The solid electrolyte may be formed on the negative electrode by, for example, sputtering.

For example, an organic electrolytic solution is prepared. The organic electrolytic solution may be prepared by dissolving a lithium salt in an organic solvent.

The organic solvent may be any solvent available as an organic solvent in the field. Examples of the organic solvent include propylene carbonate, ethylene carbonate, fluoroethylene carbonate, diethyl carbonate, methylethyl carbonate, methylpropyl carbonate, butylene carbonate, benzonitrile, acetonitrile, tetrahydrofuran, 2-methyltetrahydrofuran, γ-butyrolactone, dioxorane, 4-methyldioxorane, nitrogen (N),N-dimethyl formamide, dimethyl acetamide, dimethylsulfoxide, dioxane, 1,2-dimethoxyethane, sulforane, dichloroethane, chlorobenzene, nitrobenzene, dimethyl carbonate, methylisopropyl carbonate, ethylpropyl carbonate, dipropyl carbonate, dibutyl carbonate, diethylene glycol, dimethyl ether, and mixtures thereof.

The lithium salt may be any material available as a lithium salt in the field. Examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently an natural number), LiCl, LiI and a mixture thereof.

Figure 11:
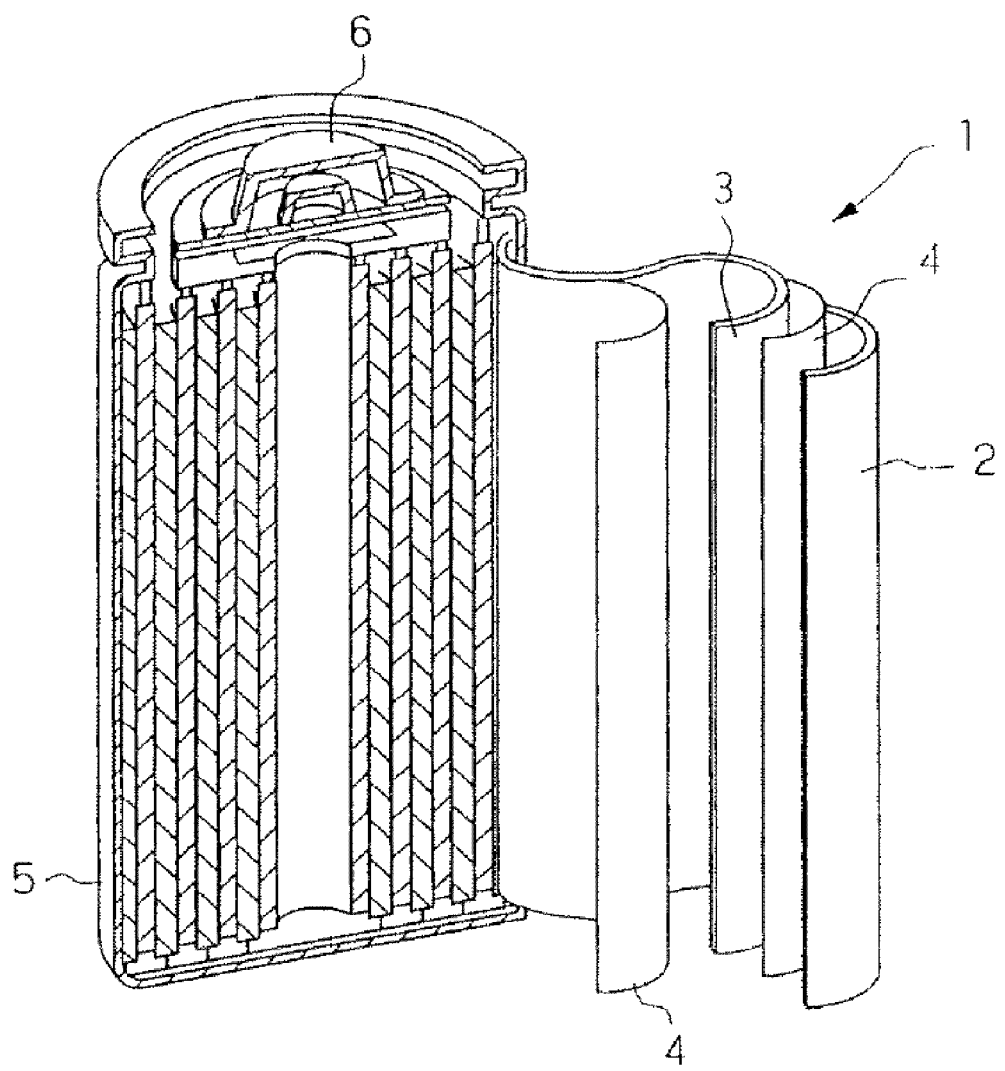
FIG. 11 is a schematic view of a lithium battery according to an exemplary embodiment of the present disclosure.

FIG. 11 is a schematic view of a lithium battery 1, according to an exemplary embodiment of the present disclosure. Referring to FIG. 11, the lithium battery 1 includes a positive electrode 3, a negative electrode 2, and a separator 4. The positive electrode 3, the negative electrode 2, and the separator 4 are would or folded, and then sealed in a battery case 5. Then, the battery case 5 is injected with an organic electrolytic solution and sealed with a cap assembly 6, thereby completing the manufacture of the lithium battery 1. The battery case 5 may be cylindrical, or rectangular. For example, the lithium battery 1 may be a thin-film type battery. The lithium battery 1 may be a lithium ion battery.

The separator 4 may be interposed between the positive electrode 3 and the negative electrode 2 to form a battery assembly. The battery assembly may be stacked in a bi-cell structure and impregnated with the electrolyte solution. The resultant is put into a pouch and hermetically sealed, thereby completing the manufacture of a lithium ion polymer battery.

The lithium battery 1 may have a discharge capacity of 0.5 mAh/cm$^2$, or greater, per unit area of the negative electrode 2. For example, the lithium battery 1 may have a discharge capacity of 1 mAh/cm$^2$, or greater, about 0.5 to about 10 mAh/cm$^2$, or about 1 to about 10 mAh/cm$^2$. In this regard, the lithium battery 1 may have a discharge capacity of about 0.5 to about 3 mAh/cm$^2$, or about 1 to about 3 mAh/cm$^2$, per unit area of the negative electrode 2. The discharge capacity per unit area of the negative electrode 2 is significantly higher than that of a general thin-film type battery.

The lithium battery 1 may have a capacity retention rate of at least 78%, after 40 cycles of charging and discharging. For example, when the lithium battery 1 is charged and discharged within a voltage of 0.01V to 2V (with respect to lithium metal), by supplying a current of 150 mA per 1 g of the nanotubes, the lithium battery 1 may have a capacity retention rate of at least 78%, after 40 cycles of charging and discharging. In this regard, the lithium battery 1 may have a capacity retention rate of at least 80%. A lithium battery including silicon nanowires may have a capacity retention rate of about 50%.

The lithium battery 1 may have an initial discharge capacity of at least about 3,000 mAh/g, i.e., at the $1^{st}$ cycle, per unit weight of the nanotubes. For example, the lithium battery 1 may have an initial discharge capacity of about 3,000 to about 4,000 Ah/g. In this regard, the lithium battery 1 may have an initial discharge capacity of about 3,100 to about 3,500 mAh/g.

According to another aspect of the present disclosure, a method of manufacturing the negative electrode 2 includes: growing nanorods that protrude from a surface of a conductive substrate; forming a Group 14 metal/metalloid coating layer on the nanorods; and thermally treating the nanorods coated with the coating layer (resultant), to selectively remove the nanorods. The Group 14 metal/metalloid may be at least one selected from the group consisting of silicon (Si), germanium (Ge), tin (Sn), and an alloy thereof.

Any suitable method may be used to grow of the nanorods. For example, nanoparticles may be coated on the conductive substrate and then immersed in a solution containing metallic ions, to grow into the nanorods protruding from the surface of the conductive substrate. Alternatively, a metal oxide thin film may be coated on the conductive substrate and then immersed in a solution containing metallic ions, to grow into the nanorods protruding from the surface of the conductive substrate. For example, the nanorods may grow perpendicular with respect to the corresponding surface of the conductive substrate.

Any suitable method may be used to form the coating layer. For example, the coating layer may be formed on the surfaces of the nanorods, by contacting the nanorods with a Group 14 metal/metalloid precursor gas.

The nanorods may be selectively thermally decomposed and removed from the coating layer, by a thermal treatment. Finally, the coating layer remains in the form of nanotubes. For example, the nanorods may be selectively thermally decomposed directly, or via a reduction reaction in a high-temperature and hydrogen (or argon) atmosphere, such that only the nanotubes remain thereafter.

According to another exemplary embodiment, the nanorods may be a metal oxide. In particular, the nanorods may be at least one metal oxide selected from the group consisting of ZnO, $Al_2O_3$, and MgO.

According to another exemplary embodiment, the nanorods may have a diameter of about 20 nm to about 200 nm. For example, the nanorods may have a diameter of about 50 nm to about 150 nm, or about 70 nm to about 120 nm.

According to another exemplary embodiment, the nanorods may have a length greater than 5 μm. For example, the nanorods may have an average length of about 5 μm to about 200 μm, about 5 μm to about 100 μm, about 5 μm to about 50 μm, or about 6 μm to about 30 μm.

According to another exemplary embodiment, the coating layer may have a thickness of about 20 nm to about 100 nm. For example, the coating layer may have an average thickness of about 20 nm to about 70 nm.

According to another exemplary embodiment, the coating layer may further include a dopant. The conductivity of the coating layer may be increased by the addition of the dopant. The dopant may include a Group 13 or Group 15 element of the periodic table of elements. For example, the dopant may include boron (B), aluminum (Al), gallium (Ga), thallium (Tl), indium (In), phosphorous (P), arsenic (As), antimony (Sb), bismuth (Bi), or the like. The Group 13 element may be a p-type dopant, and the Group 15 element may be an n-type dopant.

According to another embodiment, the formation of the coating layer may be performed by contacting the nanorods with a Group 14 metal/metalloid precursor gas. For example, the coating layer may be formed by flowing a Group 14 metal/metalloid precursor gas onto the nanorods. Examples of the Group 14 metal/metalloid precursor gas include $SiH_4$, $SiCl_4$, and $GeH_4$, but are not limited thereto. Any suitable vaporizable compound containing Group 14 metal/metalloid atoms that is available in the field may be used. The Group 14 metal/metalloid precursor gas may further include a dopant precursor gas. Examples of the dopant precursor gas include $PH_5$ and $BH_3$.

According to another exemplary embodiment, the duration of contact between the precursor gas and the nanorods may be in the range of about 1 minute to about 1,000 minutes. For example, the contact duration may be in the range of about 5 minutes to about 40 minutes. The longer the contact duration, the larger the outer diameter of the nanotubes.

According to another exemplary embodiment, the formation of the coating layer may be performed at a temperature of about 200 to about 800° C. For example, the temperature may be in the range of about 300 to about 700° C., or about 500 to about 600° C.

According to another exemplary embodiment, the nanorods may be selectively removed in a hydrogen or argon atmosphere. In the selectively removing of the nanorods, the thermal treatment temperature may be 200° C. or higher. For example, the thermal treatment temperature may be in the range of about 500 to about 800° C.

Thereinafter, one or more exemplary embodiments of the present disclosure will be described in detail, with reference to the following examples. However, these examples are not intended to limit the scope of the present disclosure. Data disclosed regarding nanotubes dimensions means averaged value in Examples and Comparative Examples, if not particularly defined otherwise.

Manufacture of Negative Electrode

Example 1

ZnO-nanorods were grown on a stainless steel substrate (Nialco, U.S.A.) having a thickness of 10 μm, which extended perpendicular with respect to a corresponding surface of the substrate. In particular, a ZnO thin film having a thickness of 500 nm was formed on the stainless steel substrate, by using a metal organic chemical vapor deposition (MOCVD) apparatus, immersed in an aqueous solution of 0.025M zinc nitrate and 0.025M metheneamine, and then left at 90° C. for 24 hours, to vertically grow ZnO nanorods on the substrate. These processes of growing the ZnO nanorods were repeated 5 times in the same aqueous solution, until the ZnO nanorods grew to a target length.

A layer of the ZnO nanorods had a thickness of 6 μm. The ZnO nanorods had a diameter of 100 nm.

$H_2$ gas and $SiH_4$ gas (diluted to 10% by volume in $H_2$ gas) were flowed onto the stainless steel substrate on which the ZnO nanorods were formed, in a chamber (manufactured in-house) at 545° C., in a hydrogen atmosphere, for 12 minutes, to form a silicon coating layer. The flow rates of the $H_2$ gas and $SiH_4$ gas were in a range of 20 sccm and a range of 60 sccm, respectively.

Next, the substrate coated with the silicon coating layer was thermally treated at a temperature of 600° C. in a hydrogen atmosphere, for 2 hours, to selectively remove the ZnO nanorods. As a result, a negative electrode with silicon nanotubes vertically arranged on the stainless steel substrate was obtained. A layer of the silicon nanotubes on the negative electrode had a thickness of 7 μm.

Figure 2:
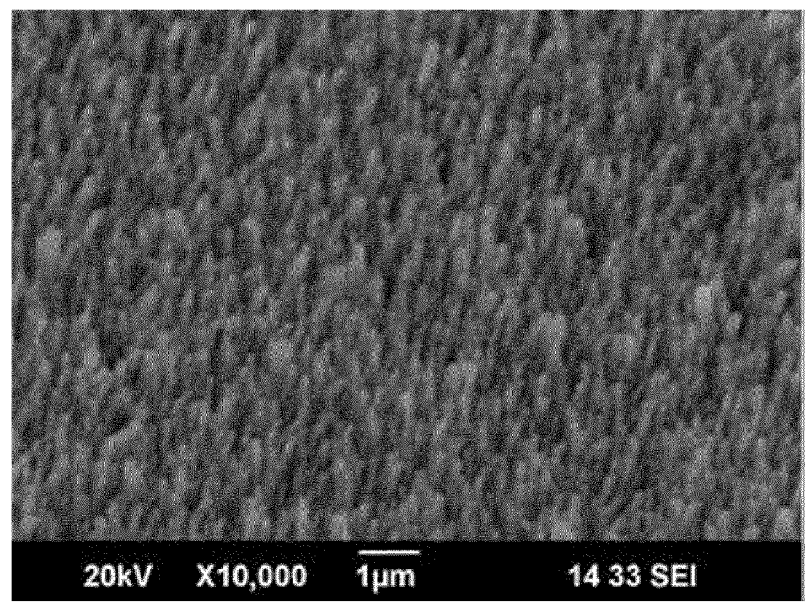
FIG. 2 is a scanning electron microscopic (SEM) image of silicon nanotubes arranged on a conductive substrate according to Example 1.
Figure 3:
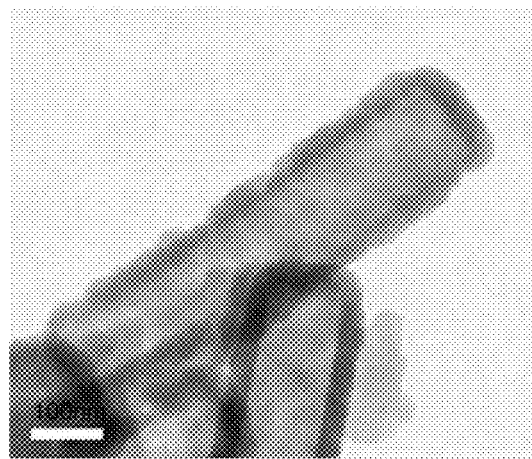
FIGS. 3 and 4 are transmission electron microscopic (TEM) images of silicon nanotubes arranged on a conductive substrate according to Example 1.
Figure 4:
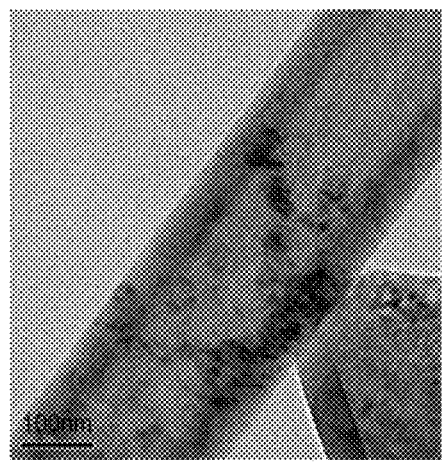

The method of manufacturing the negative electrode according to Example 1 is illustrated in FIG. 1. FIG. 2 is a scanning electron microscopic (SEM) image of the surface of the negative electrode. FIGS. 3 and 4 are transmission electron microscopic (TEM) images of the negative electrode. As can be seen in FIG. 2, a plurality of silicon nanotubes were vertically arranged on the conductive substrate.

The silicon nanotubes prepared in Example 1 had outer diameters of about 145 nm. The silicon nanotubes had an inner diameter of 85 nm. The silicon nanotubes had a wall thickness of 35 nm.

Example 2

A negative electrode was manufactured in the same manner as in Example 1, except that the flow duration of the $H_2$ gas and the $SiH_4$ gas was 17 minutes.

Example 3

A negative electrode was manufactured in the same manner as in Example 1, except that the flow duration of the $H_2$ gas and the $SiH_4$ gas was 20 minutes.

Example 4

Figure 5:
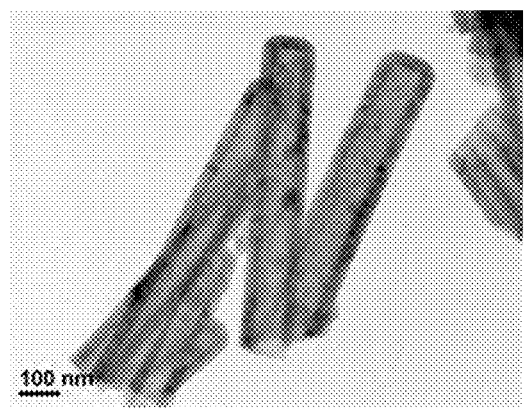
FIG. 5 is a TEM image of n-doped silicon nanotubes prepared according to Example 4.

A negative electrode was manufactured in the same manner as in Example 1, except that a mixed gas of $SiH_4$ and $PH_5$, in a volume ratio of 200:1, was used instead of the $SiH_4$ gas. FIG. 5 is a transmission electron microscopic (TEM) image of silicon nanotubes prepared in Example 4. Referring to FIG. 5, the silicon nanotubes of Example 4 had the same shape as the silicon nanotubes in Example 1, which were prepared without dopants.

Example 5

Figure 6:
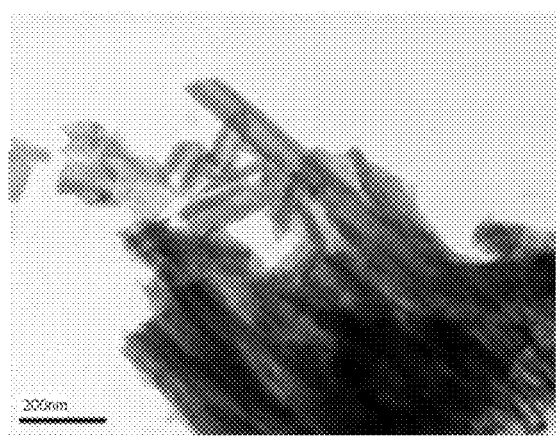
FIG. 6 is a TEM image of p-doped silicon nanotubes prepared according to Example 5.

A negative electrode was manufactured in the same manner as in Example 1, except that a mixed gas of $SiH_4$ and $BH_3$, in a volume ratio of 1500:1, was used instead of the $SiH_4$ gas. FIG. 6 is a TEM image of silicon nanotubes prepared in Example 5. Referring to FIG. 6, the silicon nanotubes of Example 5 had the same shape as the silicon nanotubes prepared in Example 1.

Example 6

ZnO-nanorods were grown on a stainless steel substrate (Nialco, U.S.A.) having a thickness of 10 μm and extended perpendicular to the substrate. In particular, a ZnO thin film having a thickness of 500 nm was formed on the stainless steel substrate, by using a metal organic chemical vapor deposition (MOCVD) equipment, immersed in an aqueous solution of 0.025M zinc nitrate and 0.025M metheneamine, and then left at 90° C., for 24 hours, to vertically grow ZnO nanorods on the substrate. These processes of growing the ZnO nanorods were repeated 10 times in the same aqueous solution, until the ZnO nanorods grew to a target length. A layer of the ZnO nanorods had a thickness of 10 μm, and the ZnO nanorods had diameters of 100 nm.

$H_2$ gas and $SiH_4$ gas (diluted to 10% by volume in $H_2$ gas) were flowed onto the stainless steel substrate, on which the ZnO nanorods were formed, in a chamber (manufactured in-house) at 545° C. in a hydrogen atmosphere, for 12 minutes, to form a silicon coating layer. The flow rates of $H_2$ gas and $SiH_4$ gas were in a range of about 20 sccm, and a range of about 60 sccm, respectively.

Next, the substrate coated with the silicon coating layer was thermally treated at a temperature of 650° C. in a hydrogen atmosphere, for 2 hours, to selectively remove the ZnO nanorods. As a result, a negative electrode, with silicon nanotubes vertically arranged on the stainless steel substrate, was obtained. A layer of the silicon nanotubes on the negative electrode had a thickness of 12 μm.

The silicon nanotubes prepared in Example 6 had outer diameters of 160 nm. The silicon nanotubes had inner diameters of 100 nm. The silicon nanotubes had a wall thickness of 30 nm.

Example 7

A negative electrode was manufactured in the same manner as in Example 6, except that the flow duration of the $H_2$ gas and the $SiH_4$ gas was 17 minutes.

Example 8

A negative electrode was manufactured in the same manner as in Example 6, except that the flow duration of the $H_2$ gas and the $SiH_4$ gas was 20 minutes.

Example 9

A negative electrode was manufactured in the same manner as in Example 1, except that a mixed gas of $SiH_4$ and $PH_5$, in a volume ratio of 200:1, was used instead of the $SiH_4$ gas.

Example 10

A negative electrode was manufactured in the same manner as in Example 1, except that a mixed gas of $SiH_4$ and $BH_3$, in a volume ratio of 1500:1, was used instead of the $SiH_4$ gas.

Example 11

ZnO-nanorods were grown on a stainless steel substrate (Nialco, U.S.A.) having a thickness of 10 μm, perpendicular with respect to the substrate. In particular, a ZnO thin film having a thickness of 500 nm was formed on the stainless steel substrate, by using metal organic chemical vapor deposition (MOCVD) equipment, immersed in an aqueous solution of 0.025M zinc nitrate and 0.025M metheneamine, and then left at 90° C. for 24 hours, to vertically grow ZnO nanorods on the substrate. These processes of growing the ZnO nanorods were repeated 5 times in the same aqueous solution, until the ZnO nanorods grew to a target length. A layer of the ZnO nanorods had a thickness of 7 μm, and the ZnO nanorods had a diameter of 105 nm.

$H_2$ gas and $GeH_4$ gas (diluted to 10% by volume in $H_2$ gas) were flowed onto the stainless steel substrate on which the ZnO nanorods were formed, in a chamber (manufactured in-house) at 545° C., in a hydrogen atmosphere, for 12 minutes, to form a silicon coating layer. The flow rates of the $H_2$ gas and the $GeH_4$ gas were in a range of 20 sccm, and a range of 50 sccm, respectively.

Next, the substrate coated with the Ge coating layer was thermally treated at a temperature of 550° C. in a hydrogen atmosphere, for 2 hours, to selectively remove the ZnO nanorods. As a result, a negative electrode with Ge nanotubes vertically arranged on the stainless steel substrate was obtained. A layer of the Ge nanotubes on the negative electrode had a thickness of 8 μm.

The Ge nanotubes prepared in Example 11 had an outer diameter of 195 nm. The Ge nanotubes had an inner diameter of 105 nm. The Ge nanotubes had a wall thickness of 45 nm.

Example 12

A negative electrode was manufactured in the same manner as in Example 11, except that the flow duration of the $H_2$ gas and the $GeH_4$ gas was 15 minutes.

Example 13

A negative electrode was manufactured in the same manner as in Example 11, except that the flow duration of the $H_2$ gas and the $GeH_4$ gas was 17 minutes.

Example 14

A negative electrode was manufactured in the same manner as in Example 11, except that a mixed gas of $GeH_4$ and $PH_5$, in a volume ratio of 200:1, was used instead of the $GeH_4$ gas.

Example 15

A negative electrode was manufactured in the same manner as in Example 11, except that a mixed gas of $GeH_4$ and $BH_3$, in a volume ratio of 1500:1, was used instead of the $GeH_4$ gas.

Comparative Example 1

A gold (Au) layer was grown on a stainless steel substrate (Nialco, U.S.A.) having a thickness of 10 μm, in order to provide a catalyst for forming silicon nanowires. In particular, the Au layer was grown on the stainless steel substrate, to a thickness of 20 nm, by using sputtering equipment.

$H_2$ gas and $SiH_4$ gas (diluted to 10% by volume in $H_2$ gas) were flowed onto the stainless steel substrate on which the Au layer was grown, in a chamber (manufactured in-house) at 545° C., in a hydrogen atmosphere for 12 minutes, to form silicon nanowires, thereby completing the manufacture of a negative electrode. The flow rates of the $H_2$ gas and the $SiH_4$ gas were in a range of 20 sccm, and a range of 60 sccm, respectively.

The experimental conditions for forming the Group 14 metal/metalloid nanotubes in Examples 1 through 15, sizes of the Group 14 metal/metalloid nanotubes, and substrate occupation ratios thereof are summarized in Table 1 below.

TABLE 1

| | Gas flow duration [Min] | Type of nano-tubes | Length of nanotubes [μm] | Outer diameter of nanotubes [Nm] | Inner diameter of nanotubes [Nm] | Wall thickness of nanotubes [Nm] | Substrate occupation ratio* [%] |
|---|---|---|---|---|---|---|---|
| Example 1 | 12 | Si | 7 | 145 | 85 | 30 | 58 |
| Example 2 | 17 | Si | 7 | 165 | 85 | 40 | 67 |
| Example 3 | 20 | Si | 7 | 185 | 85 | 50 | 69 |
| Example 4 | 12 | Si—P Doping | 7 | 145 | 85 | 30 | 58 |
| Example 5 | 12 | Si—B Doping | 7 | 145 | 85 | 30 | 58 |
| Example 6 | 12 | Si | 12 | 160 | 100 | 30 | 67 |
| Example 7 | 17 | Si | 12 | 180 | 100 | 40 | 69 |
| Example 8 | 20 | Si | 12 | 200 | 100 | 50 | 71 |
| Example 9 | 12 | Si—P Doping | 12 | 160 | 100 | 30 | 67 |
| Example 10 | 12 | Si—B Doping | 12 | 160 | 100 | 30 | 67 |
| Example 11 | 12 | Ge | 8 | 195 | 105 | 45 | 71 |
| Example 12 | 15 | Ge | 8 | 205 | 105 | 50 | 71 |

TABLE 1-continued

|  | Gas flow duration [Min] | Type of nano-tubes | Length of nanotubes [μm] | Outer diameter of nanotubes [Nm] | Inner diameter of nanotubes [Nm] | Wall thickness of nanotubes [Nm] | Substrate occupation ratio* [%] |
|---|---|---|---|---|---|---|---|
| Example 13 | 17 | Ge | 8 | 215 | 105 | 55 | 72 |
| Example 14 | 12 | Ge—P Doping | 8 | 150~240 | 90~120 | 30~60 | 71 |
| Example 15 | 12 | Ge—B Doping | 8 | 150~240 | 90~120 | 30~60 | 71 |

*Substrate occupation ratio is defined as a ratio of a volume occupied by the metal nanotubes to a volume defined by a maximum length of the metal nanotubes and the area of the substrate occupied by the metal nanotubes.

Manufacture of Lithium Battery

Example 16

The negative electrode manufactured in Example 1, a lithium metal counter electrode, a polypropylene layer (Cellgard 3510) separator, and an electrolyte solution obtained by dissolving 1.3 M of $LiPF_6$ in a mixed solvent of ethylene carbonate (EC) and diethylene carbonate (DEC) (in a 3:7 ratio by weight), were used to manufacture CR-2016 standard coin cells.

Examples 17 to 30

Lithium batteries were manufactured in the same manner as in Example 16, except that the negative electrodes manufactured in Examples 2 through 15 were used, instead of the negative electrode manufactured in Example 1.

Comparative Example 2

A lithium battery was manufactured in the same manner as in Example 16, except that the negative electrode of Comparative Example 1 was used, instead of the negative electrode manufactured in Example 1.

Evaluation Example 1

Charge-Discharge Test

Figure 7:
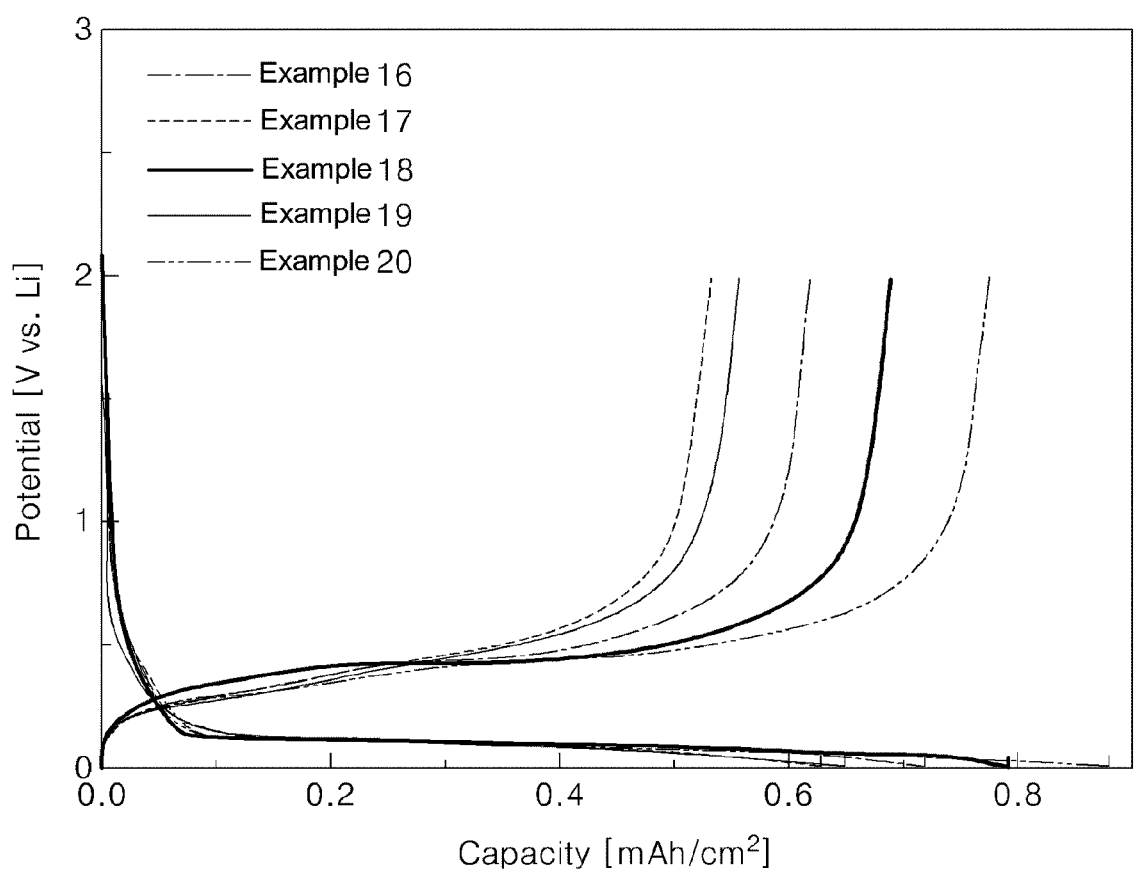
FIG. 7 is a graph showing the results of a charge-discharge test on lithium batteries manufactured according to Examples 16 through 20.

The lithium batteries manufactured according to Examples 16 through 21, 26, and 29, and Comparative Example 2 were charged until the voltage thereof reached 0.01V (with respect to Li), by applying a current of 150 mA per 1 g of the negative electrode active material (silicon nanotubes), and then discharged at the same rate until the voltage reached 2V (with respect to Li). Then, the charging and discharging were repeated 40 times. The results of the charge-discharge test from the first cycle are shown in FIG. 7. Discharge capacities per unit weight of the negative electrode, discharge capacities per unit weight of the metal nanotubes, initial coulombic efficiencies, and capacity retention rates are shown in Table 2 below. In Table 2, the initial coulombic efficiency is a ratio of discharge capacity to charge capacity at the first cycle. The capacity retention rate was calculated using Equation 2 below.

Capacity retention rate(%)=(Discharge capacity at $40^{th}$ cycle/Discharge capacity at $1^{st}$ cycle)×100   Equation 2

Evaluation Example 2

Evaluation of Lengthwise Volumetric Change in Metal Nanotubes

Figure 8A:
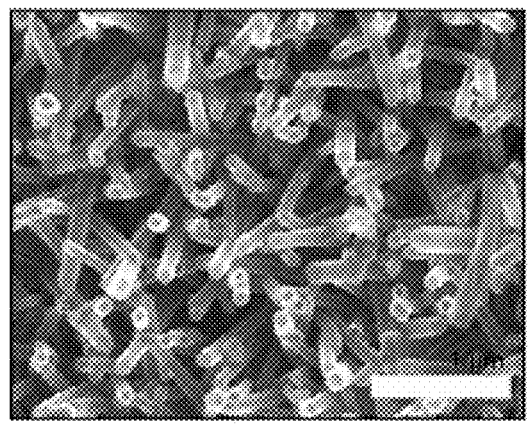
FIG. 8A is a SEM image of a surface of a negative electrode manufactured in Example 6.
Figure 8B:
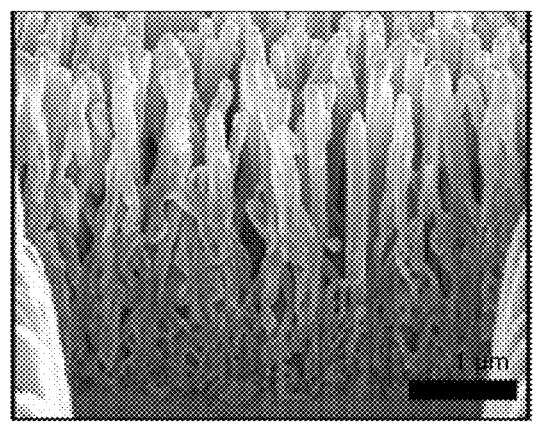
FIG. 8B is a SEM image of a cross-section of the negative electrode manufactured in Example 6.
Figure 8C:
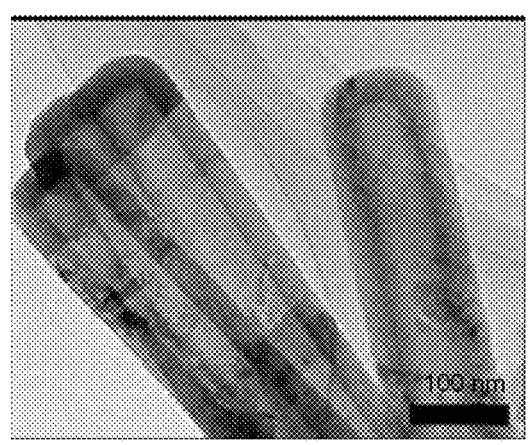
FIG. 8C is a TEM image of silicon nanotubes arranged on the surface of the negative electrode manufactured in Example 6.

Lithium Battery of Example 21
The surface and a cross-section of the fresh negative electrode of Example 6 (before use) were observed using scanning electron microscopy (SEM). In addition, the shapes of silicon nanotubes arranged on the surface of the negative electrode were observed using transmission electron microscopy (TEM). The results of the observations are shown in FIGS. 8A, 8B, and 8C. The fresh silicon nanotubes had an average length of 12 μm.

Figure 9A:
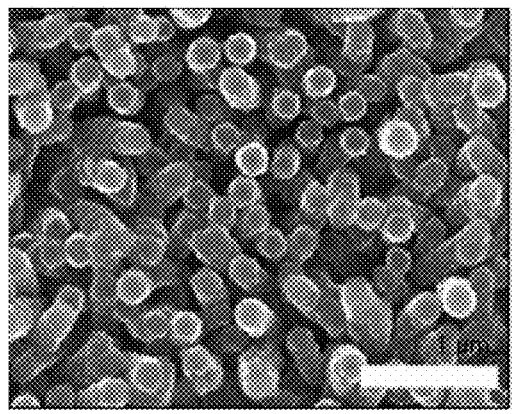
FIG. 9A is a SEM image of a surface of a negative electrode of a lithium battery of Example 21, taken after the lithium battery was charged once.
Figure 9B:
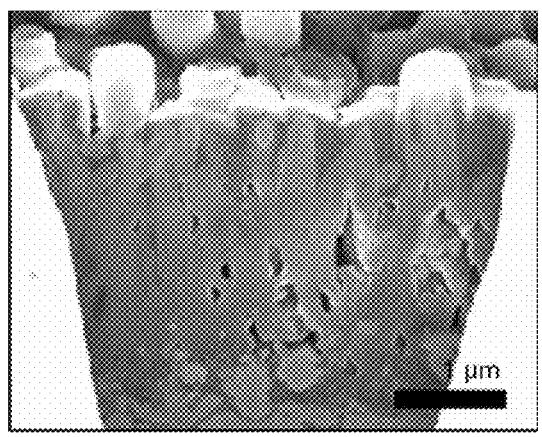
FIG. 9B is a SEM image of a cross-section of the negative electrode of the lithium battery of Example 21, taken after the lithium battery was charged once.
Figure 9C:
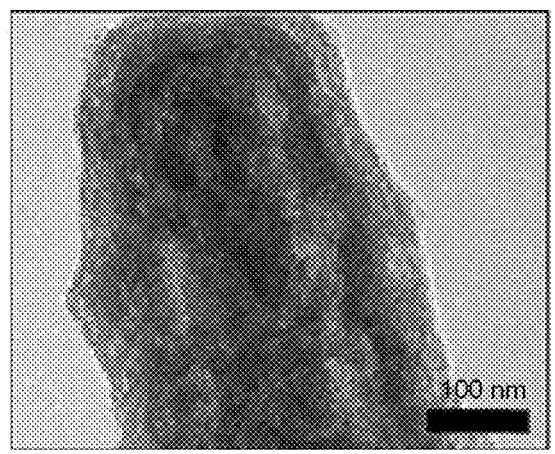
FIG. 9C is a TEM image of silicon nanotubes arranged on the surface of the negative electrode of the lithium battery of Example 21, taken after the lithium battery was charged once.

The lithium battery of Example 21 was charged one time and then dissembled, to observe a surface and a cross-section of the negative electrode by SEM and TEM. The results of the observations are shown in FIGS. 9A, 9B, and 9C. The silicon nanotubes swelled due to intercalation of lithium to an average length of 16 μm.

Figure 10A:
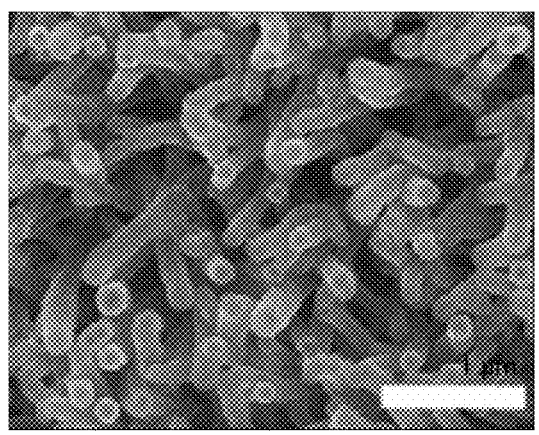
FIG. 10A is a SEM image of the surface of the negative electrode of the lithium battery of Example 21, taken after one cycle of charging and discharging.

The lithium battery of Example 21 was charged and discharged once and then dissembled to observe a surface and a cross-section of the negative electrode by SEM. In addition, the shapes of the silicon nanotubes arranged on the surface of the negative electrode were observed by TEM. The results of the observations are shown in FIGS. 10A, 10B, and 10C.

Figure 10B:
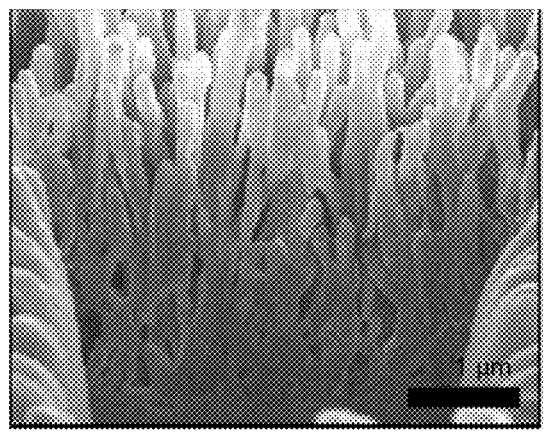
FIG. 10B is a SEM image of the cross-section of the negative electrode of the lithium battery of Example 21, taken after one cycle of charging and discharging.
Figure 10C:
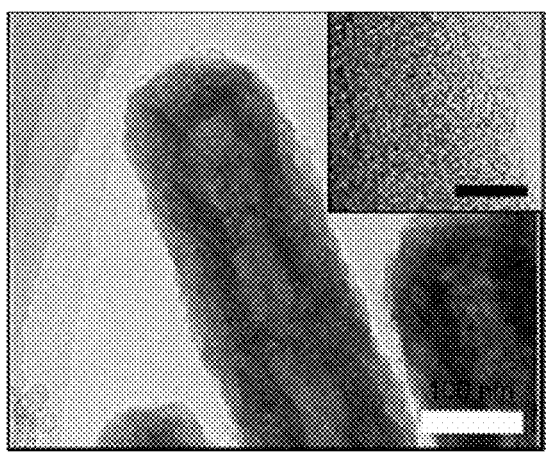
FIG. 10C is a TEM image of silicon nanotubes arranged on the surface of the negative electrode of the lithium battery of Example 21, taken after one cycle of charging and discharging.

As shown in FIGS. 8B, 8C, 10B, and 10C, the volumes of the silicon nanotubes were expanded and shrunk, due to the charging and discharging. As shown in FIG. 10B, no cracks occurred on the surfaces of the silicon nanotubes after the charging and discharging. In FIGS. 8B, 9B, and 10B, the cross-sections of the silicon nanotubes were taken in a diagonal direction from the surfaces of the substrates. Thus, the lengths of the silicon nanotubes appearing in FIGS. 8B, 9B, and 10B differ from the actual lengths thereof.

The lengthwise volume expansion ratio of the silicon nanotubes, resulting from the intercalation of lithium, was a maximum of 40%, as compared to general silicon particles, silicon nanowires, or silicon nanorods, which have a lengthwise expansion ratio of about 300 to 400%.

Lithium Batteries of Examples 16~20, 26, 29, and Comparative Example 2
The lengthwise expansion ratio of silicon nanotubes, germanium nanotubes, and silicon nanowires, in the lithium batteries of Examples 16 through 20, 26, and 29, and Comparative Example 1, and the negative electrodes of Examples 1 through 5, 11, and 14 and Comparative Example 1, respectively, used in the lithium batteries, were calculated in the same manner as for the lithium battery of Example 21 and the negative electrode of Example 6 used in the lithium battery of Example 21.

The results of the charge-discharge test with respect to the lithium batteries of Examples 16 to 21, 26, 29, and Comparative Example 2, and the lengthwise volume expansion ratios thereof, are summarized in Table 2 below.

TABLE 2

| | Type of nanotubes | Discharge capacity per unit area of negative electrode [mAh/cm²] | Discharge capacity [mAh/g] | Initial coulombic efficiency [%] | Capacity retention rate at 40th cycle [%] | Lengthwise volume expansion ratio [%] |
|---|---|---|---|---|---|---|
| Example 16 | Si | 0.58 | 3350 | 84 | 85 | 33 |
| Example 17 | Si | 0.51 | 3530 | 86 | 84 | 32 |
| Example 18 | Si | 0.67 | 3245 | 87 | 85 | 35 |
| Example 19 | Si—P Doping | 0.53 | 3290 | 89 | 81 | 38 |
| Example 20 | Si—B Doping | 0.79 | 3180 | 88 | 80 | 32 |
| Example 21 | Si | 1.04 | 3380 | 87 | 85 | 33.33 |
| Example 26 | Ge | 0.65 | 1100 | 79 | 80 | 42 |
| Example 29 | Ge—P Doping | 0.64 | 1068 | 81 | 78 | 40 |
| Comparative Example 2 | Si Nanowires | 0.45 | 3060 | 73 | 50 | Not Available |

Referring to FIG. 7 and Table 2, each of the lithium batteries of Examples 16 through 20 had a discharge capacity of about 0.5 to about 0.8 mAh/cm², per unit area of the negative electrode, at the first cycle. The lithium battery of Example 21 had a discharge capacity of 1 at least mAh/cm² per unit area of the negative electrode, at the first cycle.

In addition, each of the lithium batteries of Examples 16 through 21 had high discharge capacities of about 3,000 to about 4,000 mAh/g, per unit weight of the negative electrodes, which is almost equal to the theoretical capacity of silicon.

Each of the lithium batteries of Examples 16 to 21, 26, and 29 had an initial coulombic efficiency of at least 79%, as compared to the lithium battery of Comparative Example 2 having an initial coulombic efficiency of 73%.

The lengthwise volume expansion ratio of the metal nanotubes in each of the lithium batteries of Examples 16 through 21, 26, and 29 was less than 42%. The capacity retention rates of the lithium batteries of Examples 16-21, 26, and 29 were at least 80%, whereas the capacity retention rate of the lithium battery of Comparative Example 2 was 50%.

As described above, according to the one or more of the above exemplary embodiments of the present disclosure, the discharge capacity, capacity retention rate, and initial coulombic efficiency of a lithium battery may be improved, when the lithium battery includes a negative electrode containing Group 14 metal/metalloid nanotubes, which have a low lengthwise expansion ratio when charged and discharged.

Although a few exemplary embodiments of the present disclosure have been shown and described, it would be appreciated by those skilled in the art that changes may be made in these exemplary embodiments, without departing from the principles and spirit of the present disclosure, the scope of which is defined in the claims and their equivalents.

What is claimed is:

1. A negative electrode comprising:
a conductive substrate; and
nanotubes comprising a Group 14 metal/metalloid, disposed on the conductive substrate; where the Group 14 metal/metalloid of the nanotube contacts the conductive substrate; where the conductive substrate comprises one selected from the group consisting of stainless steel, copper, nickel, iron and cobalt.

2. The negative electrode of claim 1, wherein the nanotubes comprise one selected from the group consisting of silicon (Si), germanium (Ge), tin (Sn), and an alloy thereof.

3. The negative electrode of claim 1, wherein the nanotubes further comprise a dopant.

4. The negative electrode of claim 3, wherein the dopant comprises a Group 13 element or a Group 15 element.

5. The negative electrode of claim 3, wherein the dopant comprises at least one selected from the group consisting of boron (B), aluminum (Al), gallium (Ga), thallium (Tl), indium (In), phosphorous (P), arsenic (As), antimony (Sb), and bismuth (Bi).

6. The negative electrode of claim 1, wherein the nanotubes extend away from the conductive substrate.

7. The negative electrode of claim 1, wherein the nanotubes extend generally perpendicular to the conductive substrate.

8. The negative electrode of claim 1, wherein the nanotubes have an average length of at least about 5 μm.

9. The negative electrode of claim 1, wherein the nanotubes have an average length of about 5 μm to about 30 μm.

10. The negative electrode of claim 1, wherein the nanotubes have an average lengthwise volume expansion ratio of 100% or less.

11. The negative electrode of claim 1, wherein the nanotubes have an average lengthwise volume expansion ratio of 70% or less.

12. The negative electrode of claim 1, wherein a volume occupied by the nanotubes is at least 50% a total volume defined by a maximum length of the nanotubes and the area of the substrate upon which the nanotubes are disposed.

13. The negative electrode of claim 1, wherein the nanotubes have an average outer diameter of greater than about 5 nm.

14. The negative electrode of claim 1, wherein the nanotubes have an average outer diameter of about 100 nm to about 300 nm.

15. The negative electrode of claim 1, wherein the nanotubes have an average inner diameter of about 20 nm to about 200 nm.

16. The negative electrode of claim 1, wherein the nanotubes have an average inner diameter of about 50 nm to about 150 nm.

17. The negative electrode of claim 1, wherein the nanotubes have an average wall thickness of about 20 nm to about 100 nm.

18. The negative electrode of claim 1, wherein the nanotubes have hollow interiors.

19. The negative electrode of claim 1, wherein the nanotubes have closed ends.

20. The negative electrode of claim 1, further comprising a negative electrode active material.

21. A lithium battery comprising:
   a positive electrode;
   the negative electrode of claim 1; and
   an electrolyte disposed between the positive electrode and the negative electrode.

22. The lithium battery of claim 21, wherein the electrolyte is in a liquid or a gel.

23. The lithium battery of claim 21, wherein the lithium battery has a discharge capacity of at least about 1 mAh/cm2 per unit area of the negative electrode.

24. The lithium battery of claim 21, wherein the lithium battery has a discharge capacity of at least 1 mAh/cm2 per unit area of the negative electrode.

25. The lithium battery of claim 21, wherein the lithium battery has a capacity retention rate of at least 78%, after 40 cycles of charging and discharging.

* * * * *